United States Patent
Flinsbaugh et al.

[11] Patent Number: 6,088,662
[45] Date of Patent: Jul. 11, 2000

[54] THERMOELECTRIC TEMPERATURE SENSING SYSTEM IN A COMPUTER HARD DISC DRIVE

[75] Inventors: Jack W. Flinsbaugh, San Jose, Calif.; Ronald D. Metzner, Yukon; Clyde E. Goodner, III, Midwest City, both of Okla.; Monty A. Forehand, Yukon, Okla.; Gopinath K. Bendigeri, North Ogden, Utah

[73] Assignee: Seagate Technology, Inc., Scotts Valley, Calif.

[21] Appl. No.: 08/766,495

[22] Filed: Dec. 13, 1996

Related U.S. Application Data

[60] Provisional application No. 60/008,608, Dec. 14, 1995.
[51] Int. Cl.[7] .............................. G11B 15/18; G01K 7/00
[52] U.S. Cl. .............................. 702/132; 360/27; 369/43; 369/53
[58] Field of Search .............................. 364/557, 480; 360/27, 55, 69, 75, 104, 110, 97.01, 88; 369/43, 19, 53, 99, 176; 395/750.01, 750.06; 702/130, 132, 136

[56] References Cited

U.S. PATENT DOCUMENTS

| | | | |
|---|---|---|---|
| 3,723,980 | 3/1973 | Gabor | 340/174.1 B |
| 4,102,195 | 7/1978 | Thompson et al. | 73/340 |
| 4,330,808 | 5/1982 | Sawada et al. | 361/25 |
| 4,436,699 | 3/1984 | Narato et al. | 422/68 |
| 4,488,192 | 12/1984 | Treseder | 360/98 |
| 4,602,872 | 7/1986 | Emery et al. | 374/152 |
| 4,796,121 | 1/1989 | Adamek et al. | 360/78.13 |
| 5,041,931 | 8/1991 | Uno et al. | 360/97.03 |
| 5,182,742 | 1/1993 | Ohmori et al. | 369/116 |
| 5,194,865 | 3/1993 | Mason et al. | 341/132 |
| 5,291,607 | 3/1994 | Ristic et al. | 395/750 |
| 5,422,832 | 6/1995 | Moyal | 364/557 |
| 5,440,437 | 8/1995 | Sanada et al. | 360/104 |
| 5,528,172 | 6/1996 | Sundstrom | 326/80 |
| 5,557,550 | 9/1996 | Vigil et al. | 364/557 |
| 5,566,077 | 10/1996 | Kulakowski et al. | 364/480 |

*Primary Examiner*—Patrick Assouad
*Attorney, Agent, or Firm*—Flehr Hohbach Test Albritton & Herbert LLP

[57] ABSTRACT

A temperature sensing system for use in a computer disc drive comprises a themoelectric sensor having an output sensor voltage which is variable as a function of temperature, an interface circuit adapted to receive the output sensor voltage from the thermoelectric sensor and adapted to generate a scaled and level-shifted analog output voltage signal, and an analog-to-digital converter circuit adapted to receive the analog output signal voltage from the interface circuit and convert the analog output signal voltage into a digital signal which is compared to various defined thresholds.

5 Claims, 3 Drawing Sheets

THERMOELECTRIC TEMPERATURE SENSING SYSTEM IN A COMPUTER HARD DISC DRIVE

CROSS REFERENCE TO RELATED APPLICATION

The present application is filed based upon Provisional Patent Application No. 60/008,608 entitled "Thermoelectric Temperature Sensing System in a Hard Disc Drive Application", filed Dec. 14, 1995.

TECHNICAL FIELD

The present invention relates to temperature sensing systems and more particularly to temperature sensing systems using thermoelectric sensors.

BACKGROUND OF THE INVENTION

The read/write performance of a computer hard disc drive varies as its temperature varies. This is true both for the electrical and mechanical properties of a hard drive disc which are affected by these temperature changes. For instance, various electrical features such as head-load performance and reliability as well as read signal magnitude and profile can change as a function of these temperature changes. In addition, its seek performance tends to decrease as its temperature increases due to changes in the servo system gains. Various mechanical constraints such as the thickness of the actuator bearing grease are also known to be temperature dependent. At cooler temperatures, the actuator bearing grease becomes thicker and the read/write flex of the actuator becomes somewhat stiffer thus increasing biasing forces on the actuator which tend to restrain both its movement and flexibility. Furthermore, tracking error ascribable to thermal expansion of the magnetic head arm corresponding to temperature elevation also results from thermal expansion and dimensional change to the magnetic head and the discs. Moreover, motor performance which is also affected by temperature, changes with the motor winding resistance increasing and bearing grease thickening as the temperature increases. This in turn affects the motor start performance and reliability. Specifically, resistance in the read and write elements of the magneto-resistive (MR) heads increase and the performance of the electronic components (such as the gain, frequency response, propagation delays and noise) in general degrade at higher temperatures.

These temperature dependent problems are somewhat unavoidable as the disc drive itself will heat up after either a long period of operation or by the raising of ambient temperatures. Most commonly, this temperature elevation occurring in the hard disc is mostly due to thermal energy being emitted by the drive electronics, and to a lesser degree by windage loss due to the disc's rotation.

Since temperature has many adverse effects on hard drive performance and since these effects tend to change in response to temperature changes, equipping a hard disc drive of a computer with a temperature measuring mechanism would allow this hard drive to be designed or operated so as to compensate for these various temperature changes. This would thus ensure maximum drive performance and reliability under various and changing temperature environments. In addition, determining and recording the temperature in the disc drive when an error occurs could provide valuable information which could later be used to assist in determining the cause of the error.

Various prior art systems are directed to temperature-based problems occurring in computer hard disk drives, but these systems are all quite limiting for reasons discussed herein. For example, the problem of temperature changes causing the unwanted movement of a magnetic head attached to an actuator arm in a magnetic disc drive was noted in U.S. Pat. No. 5,440,437 to Sanada, et al. As a way of compensating for movement caused by the thermal expansion and contraction of the actuator arm, this patent discloses a magnetic head arm being partially constituted by a member of a different co-efficient of thermal expansion than the remaining portion of the magnetic head arm. Accordingly, this system was able to correct for tracking errors ascribable to the thermal expansion of the magnetic head arm at varying ambient temperatures. Only being designed to correct for tracking errors caused by the thermal expansion and contraction of the magnetic arm, the Sanada system is not enabled to provide any measuring and feedback of the ambient temperature such that other temperature dependent phenomenon including read signal magnitude and profile, bearing grease thickness, magnetic head arm flexure, seek performance, motor performance and motor winding resistance could be compensated for at varying temperatures.

Various other systems exist for compensating for temperature dependent factors affecting hard drive performance, but these systems all tend to be restricted to preventing, rather than compensating for, these effects. For example, a system for positioning a magnetic head of a magnetic disc device such that the heat produced by the stepping motor has no significant influence on the magnetic head support is disclosed in U.S. Pat. No. 4,796,121 to Adamek, et al. This system does not provide any measuring and feedback of ambient temperatures but rather is directed entirely to shielding the magnetic head from damaging heat using a foil with satisfactory heat sinking properties to shield the motor.

Another system for compensating for temperature-based effects in a magnetic disc memory is provided in U.S. Pat. No. 3,723,980 to Gabor. In this system, the various parts of the disc drive are all kept at substantially uniform temperature by controlled air flow and any thermal expansion/contraction changes are compensated for by the use of similar materials in similar locations in the design of the magnetic disc memory unit. Accordingly, this system only provides temperature compensation with respect to the thermal expansion or contraction of its various mechanical parts. This device is not, however, adapted to measure or provide feedback as to these various temperature changes such that temperature compensation could be provided for various other temperature dependent concerns such as the density of bearing grease or the flexibility of the mechanical actuator arm.

A device exists for laser sensing the temperature of a rotating disc cartridge by forming the disc cartridge out of the same material as the disc itself so as to avoid an orifice being cut in the disc to be used in conjunction with a radiation thermometer. Such a system is disclosed in U.S. Pat. No. 5,182,742 to Ohmori, et al. This system is, however, designed solely to measure the temperature in a disc cartridge and is not adapted to measure or compensate for temperature changes in the magnetic head assembly of a hard disc drive.

A number of systems exist for cooling disc drives. Examples are disclosed in U.S. Pat. No. 4,488,192 to Treseder and U.S. Pat. No. 5,041,931 to Uno, et al. Unfortunately, these systems operate simply to cool the disc drives and are not adapted to measure or provide feedback as to the temperatures or temperature changes occurring in these hard disc drives.

As can be appreciated, none of the above systems satisfy a long-felt need for a system which is adapted to measure the temperature in a computer hard disc drive such that this temperature feedback can be used in both the design and the control operation of various systems for compensating for the effects of temperature variance in the computer disc drive.

OBJECTS OF THE INVENTION

Accordingly, it is an object of the present invention to provide a system for sensing the temperature in a computer hard disc drive.

It is another object to provide a system whereby the temperatures occurring in a computer hard disc drive are measured such that they can be digitally recorded directly onto a computer hard disc drive, periodically as desired, and especially during the occurrence of an error condition on the disc drive.

It is another object to provide temperature measurement in a hard disc drive which can be used to improve read performance by optimizing various temperature related read/write parameters occurring in the magnetic head and rotating disc drive.

It is another object to provide temperature measurement in a hard disc drive which can be used to select the optimal MR preamp write current magnitude in the magnetic read/write head.

It is another object to provide temperature measurement in a hard disc drive which can be used to optimize read bias current.

It is another object to provide temperature measurement in a hard disc drive which can be used to improve head-load reliability by adjusting for biases that change in the disc drive as a function of temperature.

It is another object to provide temperature measurement in a hard disc drive which can be used to improve seek performance by compensating for temperature-dependent gain changes that occur in the disc drive.

It is another object to provide temperature measurement in a hard disc drive which can be used to improve the motor start reliability by adjusting the motor start profile as a function of the temperature in the disc drive.

It is an object to provide temperature measurement in a hard disc drive using minimal interface circuitry and leveraging from the existing design of the disc drive.

DISCLOSURE OF THE INVENTION

The present invention discloses a temperature sensing system for use in a computer disc drive comprising a thermoelectric sensor having an output sensor voltage which is variable as a function of temperature, an interface circuit adapted to receive the output sensor voltage from the thermoelectric sensor and adapted to generate a scaled and level-shifted analog output voltage signal, and an analog-to-digital converter circuit adapted to receive the analog output signal voltage from the interface circuit and convert the analog output signal voltage into a digital signal.

BEST MODE OF CARRYING OUT THE INVENTION

Temperature variations occurring in computer hard drives are known to cause various mechanical and electrical effects which may not be desirable. The present invention provides a temperature sensing system for use in a computer hard disc drive such that the temperature sensed in the disc drive can be easily measured and then recorded as desired. As such, the present invention provides a temperature measurement system which can be used as feedback for controlling, or compensating for, these various temperature-dependent electrical and mechanical effects.

As is shown schematically in the block diagram FIG. 11, a temperature sensor 10 is provided which is used to measure the ambient air temperature when positioned inside a computer hard disc drive. Temperature sensor 10 preferably consists of a transducer emitting an output sensor voltage which is variable as a function of temperature. A National Semiconductor LM45C found in a SOT-23 package was found to perform this temperature sensing function. This particular sensor device was chosen for many factors. Most importantly, it has a very low cost, low error margin, and adds a minimal component count to the system. In addition, this device has a printed circuit board surface area which is quite small, thus enabling it to be positioned internally in a computer disc drive without interfering with the operation of any of the other system components, thus taking up only a minimal amount of room in the hard disc drive design.

The output voltage of this thermoelectric temperature sensor 10 ranges from 0 to 1 volt. Accordingly, when supplied with a voltage of 5 volts (plus or minus 10%), this thermoelectric sensor will output 10 millivolts per degree Celsius with a linear mapping of 0° Celsius corresponding to 0 volts and 100° Celsius corresponding to 1 volt. Accordingly, the temperature to voltage relationship is governed by the equation $$V[T] = c_1 \times T + \epsilon$$

where $c_1$ equals 0.01 volts per degree Celsius and $\epsilon$ equals the error component of plus or minus 0.04 volts.

Figure 1:
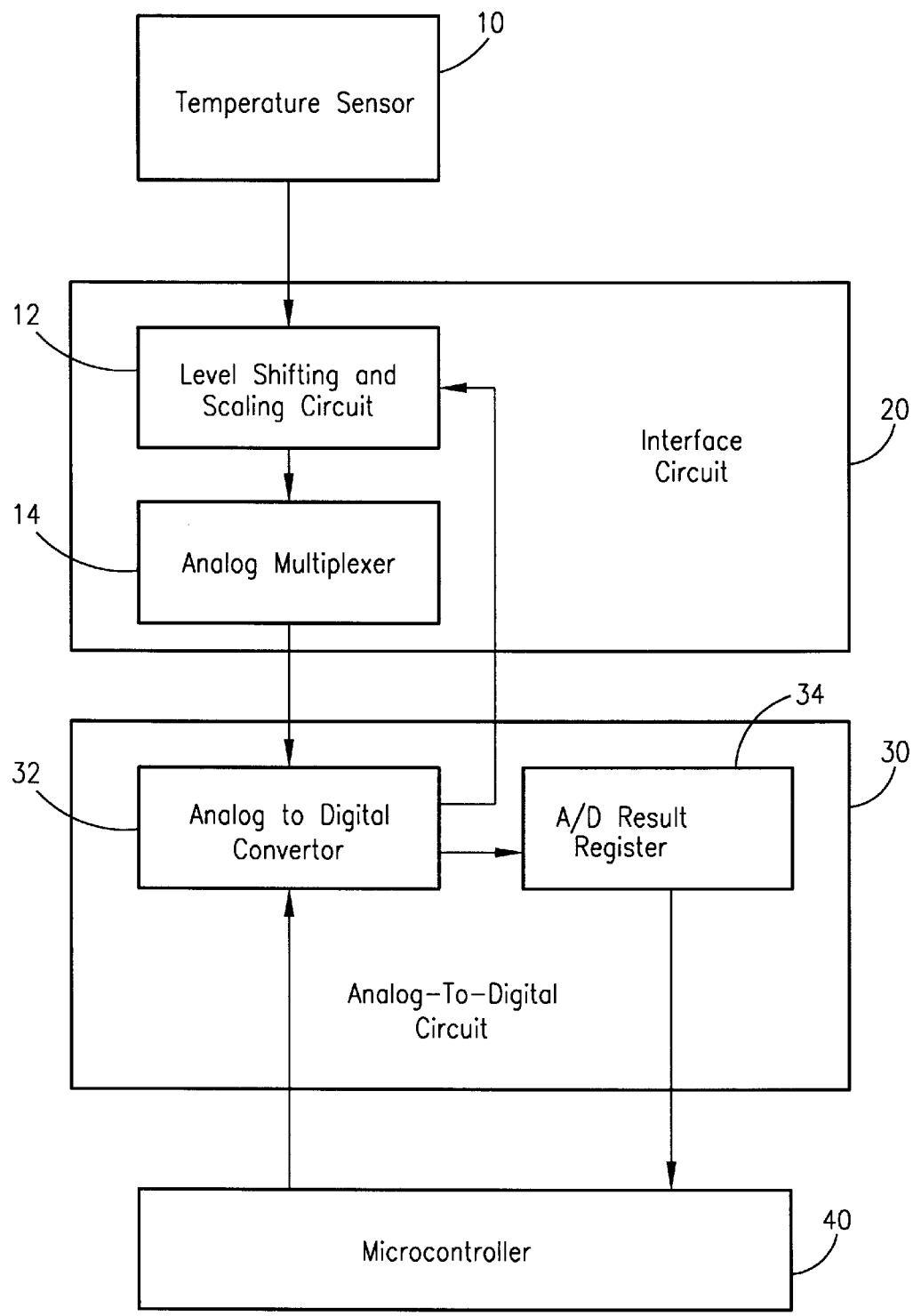
FIG. 1 shows a block diagram of the components of the temperature sensing system of the present invention.

As is also seen in FIG. 1, an interface circuit 20 comprises a voltage level shifting and scaling circuit 12 and an analog multiplexer 14 which are fabricated onto a single medium scale integrated chip. The fabrication of this interface circuit on a medium scale integrated chip is preferably made as a custom design from parts DS-1671 made by Dallas Semiconductor and 83492096–83492099 from Seagate Technology. This interface circuit 20 is adapted to receive the output sensor voltage from the thermoelectric sensor 10 and shift and scale this voltage so as to produce an input analog signal voltage corresponding to the input range of an analog-to-digital converter 32 which is found in a servo demodulator circuit 30. This servo demodulator 30 is preferably formed on a second large scale integrated chip and comprises both the analog-to-digital converter 32 and an analog-to-digital result register 34.

The analog-to-digital circuit 30 of the present invention comprises an analog-to-digital converter 32 and an analog-to-digital results register 34. Convertor 32 is designed to receive an input signal ranging from 1.115 to 3.345 volts. Accordingly, the output voltage signal of the thermoelectric temperature sensor must be shifted and scaled before it is input into this analog-to-digital converter 32. Level shifting and scaling circuit 12 accomplishes this function and is shown in detail in FIG. 2. In the diagram of this circuit, Vtemp represents the voltage received from thermoelectric sensor 10 and Vdacout represents the voltage which is present across the input to the analog-to-digital converter 32. Vdacref represents a reference voltage signal which is sent from the analog-to-digital converter 32 back into the level shifting and scaling circuit 12. Various resistors R1, R2, R3, R4, and R5 are shown having resistances of 2.473 K Ohms, 618 Ohms, 560 Ohms, and 840 Ohms respectively. As is also seen, an operational amplifier is also found in this circuit to assist in scaling the input voltage Vtemp to corresponding output voltage Vdacout.

Figure 2:
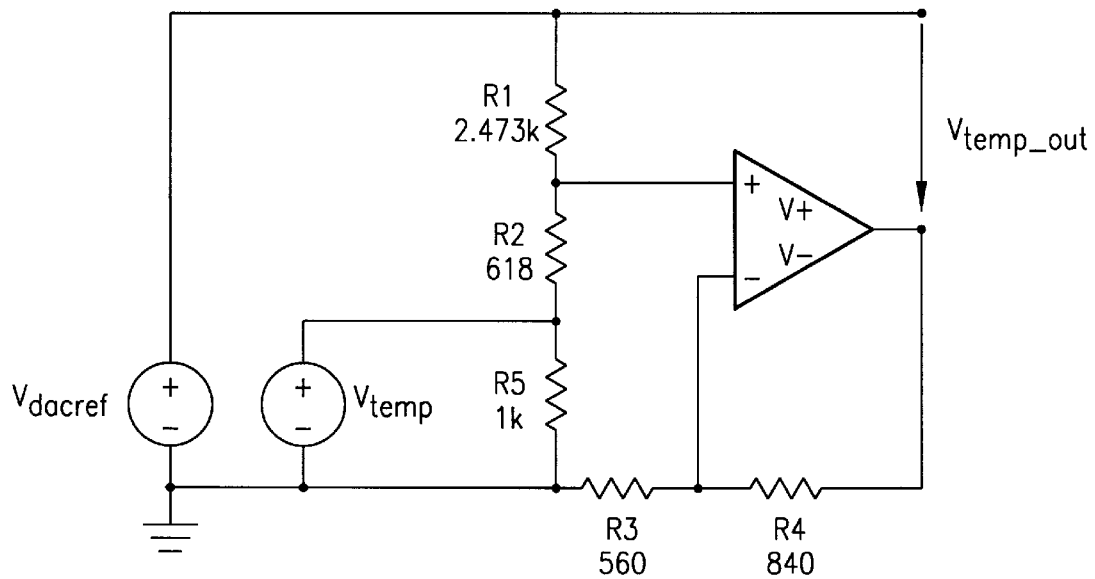
FIG. 2 shows a circuit diagram of a voltage level shifting and scaling circuit.
Figure 3:
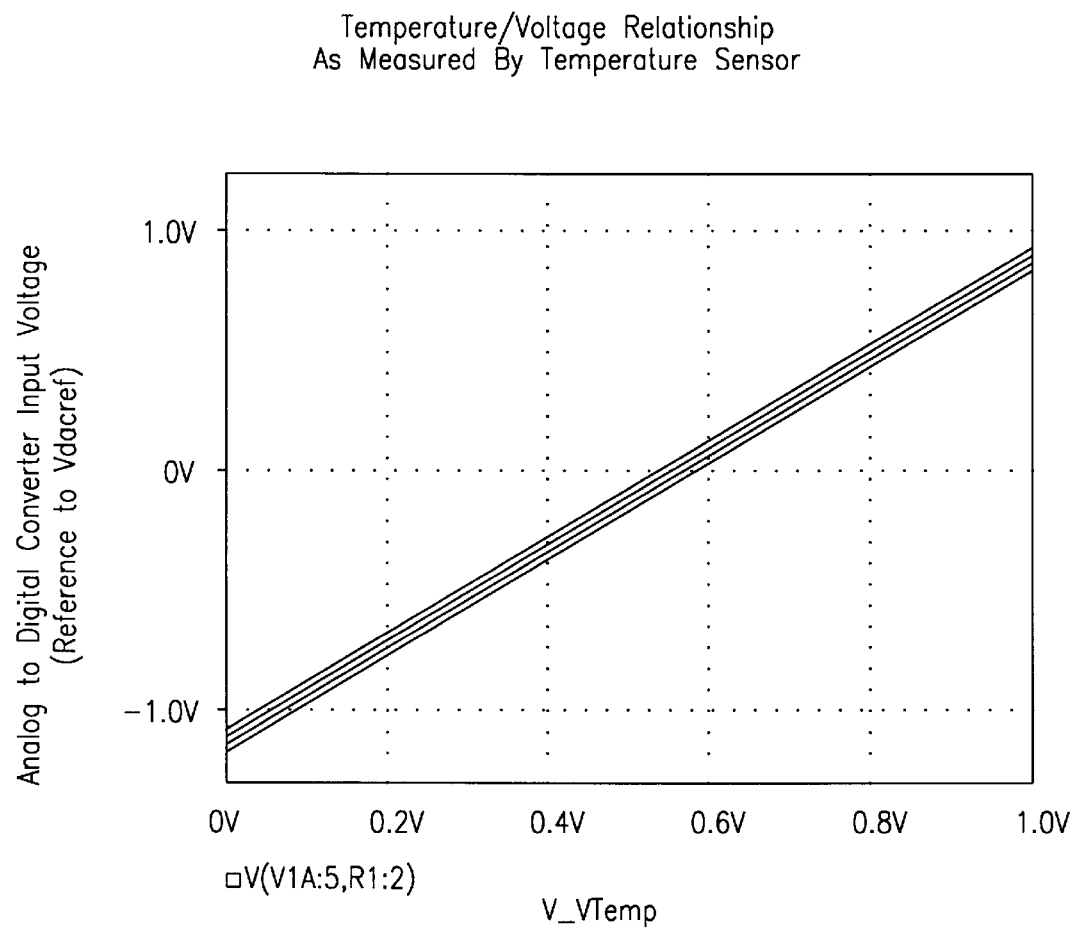
FIG. 3 shows the linear relationship between temperature and voltage as measured by the temperature sensing apparatus of the present invention.

FIG. 3 shows the transfer function of the level shifting and scaling circuit shown in FIG. 2 relating Vtemp [the output of the thermoelectric sensor] to Vdacout [the output of the interface circuit which is input to the analog-to-digital converter 32]. As can be seen, a linear relationship is shown between these corresponding voltages. As such, the interface circuit 20 maintains the same accuracy over a wide temperature range, with 0° Celsius corresponding to 0 volts Vtemp through to 100° Celsius corresponding to 1.0 volts Vtemp.

Accordingly, within the ranges of temperatures from 0° Celsius to 100° Celsius, the following performance characteristics of the level shift and scaling circuit will therefore be seen. At T=0° Celsius and therefore Vtemp=0, Vdacout will=1.115×Vdacref. At T=100° Celsius and therefore Vtemp=1 volt, Vdacout will=3.345×Vdacref. Between these extremes of temperatures, the range of Vdacout will be linearly proportional to the range of Vtemp which is linearly proportional to the ambient temperature. Accordingly, the level shifting and scaling circuit 12 of interface circuit 20 provides DC offset, scaled gain and rereferenced interfacing with the analog-to-digital circuit 30.

An analog multiplexer 14 also found in interface circuit 20 operates to select the output sensor voltage from the thermoelectric sensor to be routed to the analog-to-digital converter channel.

Analog-to-digital result register 34 receives the digital output signal voltage from the analog-to-digital converter 32 and stores this signal as a 10 bit binary value which is then received into a microcontroller 40 (which is used for digital signal processing of the digital signal received from the analog-to-digital circuit), thus converting this signal into a readable and easily recordable temperature value. Sending a reference feedback voltage to the level shifting and scaling circuit 12, analog-to-digital circuit 30 thus provides analog-to-digital conversion with referenced sampling.

Accordingly, analog-to-digital converter 32 converts the analog signal received from the level shifting and scaling circuit 12 into a 10 bit digital value representing the input voltage differential with respect to the analog-to-digital reference voltage Vdacref.

The present system has been implemented and verified to work on a ST34371 [Barracuda 4LP] hard disc drive made by Seagate Technologies. During operation, temperature sensor 10 and interface circuit 20 are preferably mounted on an external circuit board and attached to the disc drive circuit board via wires. In another embodiment, one temperature sensor 10 could be mounted on the flexure arm inside the hard disc assembly and a second temperature sensor 10 could be mounted on an external printed circuit board and attached to the disc drive circuit board via wires. The integration of the voltage level shifting and scaling circuit 12 and analog multiplexer 14 into the medium scale integrated circuit chip 20 provides for a small 24-pin design with the temperature sensor itself requiring only a 3-pin outline package design. Accordingly, the present temperature sensing apparatus enables the microcontroller 40 to determine the ambient temperature using a minimal amount of interface circuitry and leveraging from the existing computer hard disc drive.

There are numerous applications for using the temperature information sensed by the present invention. For instance, the disc drive temperature could be measured and thereby recorded concurrent with the occurring of an error condition on the disc. This would allow failure analysis through event logging. Knowing the temperature of the hard disc drive during the occurrence of the error condition is important information which can assist in the effort to understand the causation of the error condition itself. Specifically, the temperature sensor information can be used to provide temperature feedback information during an error recovery thus improving the disc drive performance by optimizing the read/write parameters which are affected by temperature. As such, the various read/write parameters settings can be set so as to remain in effect until a subsequent error recovery is performed. In addition, the present invention can also be used in determining whether various error conditions are temperature dependent or temperature influenced.

Another application of using this temperature measurement system would be in selecting the optimal MR preamp write current magnitude in the magnetic read/write head.

An additional application of the present invention is to use its temperature sensing ability to improve head-load reliability by adjusting for biases that changes the function of temperature. Examples of such biases include the actuator bearing grease thickening and the amount of flex in the read/write arm becoming stiffer at cooler temperatures. By using the present temperature sensor apparatus, changes in these biases can be compensated for at various temperatures thus resulting in improved head-load reliability.

The present invention can also be used to improve seek performance as this tends to decrease as temperature increases due to changes in the servo system gains. During an error recovery sequence of a seek error, the hard disc drive temperature can be measured by the present apparatus. If there is a significant difference between the current temperature and the temperature at which previous servo calibrations were performed, the servo calibrations can be performed again with the current temperature stored for future reference. Accordingly, the results of these calibrations can remain in effect until it is deemed necessary to recalibrate the servo gains due specifically to any errors caused by temperature changes.

The present temperature sensing apparatus can also be used when improving motor start reliability by adjusting the motor start profile as a function of temperature. In this way, the measured temperature can be used to compensate for changes such as the thickening of bearing grease in the motor.

What is claimed is:

1. An apparatus for sensing the temperature in a computer hard disc drive and controlling operating parameters within the disc drive in response thereto, comprising:

a) a thermoelectric sensor having an output sensor voltage which is variable as a function of temperature, b) an interface circuit adapted to receive the output sensor voltage from said thermoelectric sensor and adapted to generate a scaled and level-shifted analog output voltage signal, c) an analog-to-digital circuit adapted to receive said analog output signal voltage from said interface circuit and convert said analog output signal voltage into a digital signal, and d) a microcontroller which receives the digital signal from said analog-to-digital converter circuit and converts the digital signal into a temperature representative value, said microcontroller further being adapted to store said temperature values on a hard disc drive and be responsive to said stored temperature values and detection of an error condition to adjust read/write parameter settings until the error condition is ended.

2. An apparatus as claimed in claim 1 wherein said microcontroller further comprises means for selecting an optimal MR pre-amp write current magnitude for application to a magnetic read/write head in said disc drive.

3. An apparatus as claimed in claim 1 further comprising means in said controller for adjusting for current biases affected by changes in temperature.

4. An apparatus as claimed in claim 1 wherein said microcontroller further comprises means responsive to said temperature detection and storage to recalculate servo calibrations to adjust for errors caused by temperature changes.

5. An apparatus as claimed in claim 1 wherein said microcontroller further comprises means for altering a motor starting profile in said disc drive as a function of the operating temperatures stored on said hard disc drive.

* * * * *